May 26, 1970     A. A. LANE     3,514,625

SYSTEM FOR PROVIDING UNINTERRUPTED ELECTRICAL POWER

Filed Feb. 20, 1968

INVENTOR.
ABBOT A. LANE
BY Harry A. Herbert Jr
ATTORNEY
Henry S. Miller Jr
AGENT United States Patent Office 3,514,625
Patented May 26, 1970

3,514,625
SYSTEM FOR PROVIDING UNINTERRUPTED
ELECTRICAL POWER
Abbot A. Lane, West Acton, Mass., assignor to the
United States of America as represented by the Secretary of the Air Force
Filed Feb. 20, 1968, Ser. No. 706,978
Int. Cl. H02j 7/00, 9/00
U.S. Cl. 307—67    1 Claim

ABSTRACT OF THE DISCLOSURE

A system for providing uninterrupted electrical power including an AC motor, AC generator and DC motor mechanically connected whereby, if the AC motor fails the DC motor will continue to operate on battery power, or alternatively, a similar system whereby the DC motor is replaced by a DC motor generator which normally operates as a generator charging a battery and a flywheel being provided to operate the generator during the changeover to a DC motor in the event of an AC power failure.

BACKGROUND OF THE INVENTION

Modern computers and electronic data processing equipment provide a new and severe requirement for uninterrupted electrical power. In the past electrical equipment was generally unaffected by momentary interruptions in power, slight changes in voltage or frequency would be virtually unnoticed, however, in the computer and allied fields power interruptions, transients or disturbances may cause partial or complete failure of the magnetic memory. In addition, a power failure could cause serious damage or deterioration of associated equipment, particularly when heat removal is critical.

Ordinarily computers and computer-type devices are constructed in such a manner that they may be shut down or de-energized in a sequence of steps taking a finite amount of time.

In another aspect, continuous power is needed in submarine cables of the type utilized in overseas communications. These cables are provided with amplifiers and relay switching equipment at predetermined intervals along their entire length. In the event of a partial or complete power failure, resistances in these components change, causing an unfavorable heat buildup. Ordinarily this equipment is designed to last in excess of twenty years; heat, however, will substantially shorten the lifetime of the components, and may result in immediate failure of some components.

In order to replace the components of a submarine cable it is necessary to dispatch a repair ship, find the cable, and lift the cable to the surface where the components can be replaced. The cost involved in this type of operation makes it imperative that there be an uninterrupted supply of power.

SUMMARY OF THE INVENTION

This invention relates generally to a system for providing uninterrupted electrical power, and more specifically, to a system which will provide uninterrupted power for sensitive electronic instruments and devices.

It is a primary object of this invention to provide a new and improved source of uninterrupted and perturbation-free electrical power.

It is another object of this invention to provide a system for uninterrupted power which does not require the use of a flywheel.

It is a further object of this invention to provide a system for uninterrupted power which does not require the use of AC-DC converters as in the prior art.

It is still another object of this invention to provide a system which will provide continuous power free from cyclic transients or disturbances.

It is still a further object of this invention to provide a continuous power supply system which is economical to produce and utilizes conventional, currently available components that lend themselves to standard mass-production manufacturing techniques.

These and other advantages, features, and objects of the invention will become more apparent from the following description taken in connection with the illustrative embodiments in the accompanying drawings.

DESCRIPTION OF THE PREFERRED EMBODIMENTS

Figure 1:
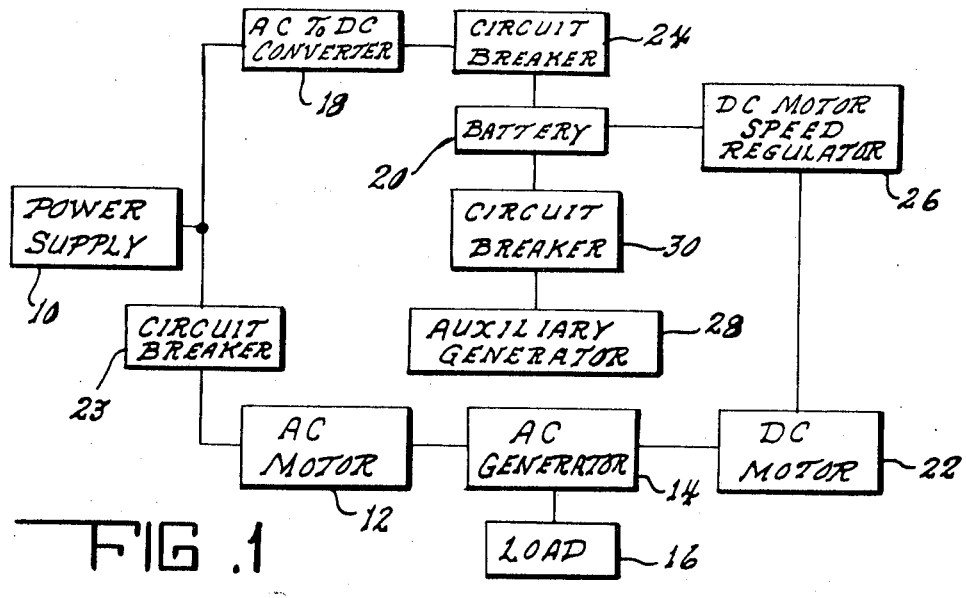
FIG. 1 is a block diagram of one embodiment of the invention.

In the first embodiment, shown in FIG. 1, electrical power is supplied to the system from an outside source 10. This source may be as conventional as power company generators, or alternately, at a remote location, gas or diesel generators may provide electrical power. As the power enters the system it is divided with the majority of the current being supplied to the AC motor 12 which drives the AC generator 14 and provides closely controlled power to the load 16. The remaining power is supplied to an AC to DC converter 18 which charges the storage battery 20. In the event of a complete power failure or perturbation in the power flow, the circuit breakers 23 and 24 will disconnect the outside power.

The DC motor 22 which is operated simultaneously with the AC motor 12 will continue to operate generator 14 and provide uninterrupted power to the load 16. Under ordinary circumstances the speed regulator 26 is adjusted so that the DC motor will agree with the synchronous speed of the AC motor. An emergency DC charger engine generator 28 can be started to maintain the battery until the AC power returns, in the event of a prolonged failure. Similarly, if desired, an AC standby engine generator (not shown) can be started to provide power to the AC motor until the original power returns.

Where high reliability is mandatory, the DC drive should continue until the main AC power source is reestablished and all variations or disturbances in the power flow eliminated. Sensors, well known in the art, can be used to indicate when the main AC power source is stable. The DC motor speed controller can be used to synchronize the AC motor which is mechanically connected through the AC generator to the DC motor to the main power source.

Figure 2:
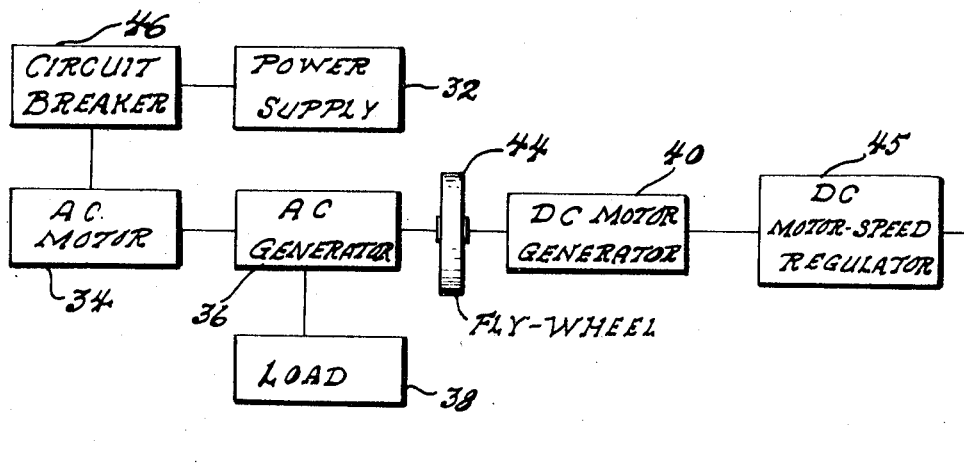
FIG. 2 is a block diagram of another embodiment of the invention.

The embodiment of FIG. 2 may be utilized where close frequency control over equipment is not required. An AC power supply 32 provides the power during normal operation to the AC motor 34 which actuates the AC generator 36. The generator 36 provides power to the load 38. Connected mechanically to the AC induction motor 34 is a DC motor-generator 40. The motor-generator 40 is normally used as a generator and keeps the battery 42 charged. When AC power fails, the flywheel 44 mounted on the shaft between the AC generator 36 and the DC motor-generator 40 provides momentum enough to carry the generator 36 while the DC motor is reconnected automatically by means of the motor-speed regulator 45 for DC motor operation receiving power from the battery 42. In the event of a power failure or interruption, the circuit breaker 46 will disconnect the outside power supply 32 from the rest of the system. Again, in the event of a sustained power loss, it may be necessary to keep the battery 42 charged by means of the auxiliary gas or diesel generator 48 which is connected through circuit breaker 50.

Having thus shown an embodiment for providing uninterrupted electrical power for components which require carefully regulated current and an embodiment for those electrical components which require only continuous but not controlled power, those skilled in the art will understand that the invention is capable of a variety of alternative embodiments within the spirit and scope of the appended claims.

I claim:

1. A system for providing a sole source of uninterrupted electrical power comprising: an AC generator for producing controlled electrical power; an AC motor connected to a supply of AC current for driving the generator; a DC motor connected to a supply of DC current and driving the AC generator simultaneously with said AC motor; and motor speed regulating means connected to the DC motor for controlling the speed of said motor, whereby said AC generator has an output that is unaffected by variations in the AC current applied to the AC motor.

References Cited

UNITED STATES PATENTS

| 2,194,822 | 3/1940 | Dannheiser | 307—67 X |
| 3,243,598 | 3/1966 | Grillo | 307—68 |

FOREIGN PATENTS

| 679,831 | 9/1952 | Great Britain. |

ROBERT K. SCHAEFER, Primary Examiner

H. J. HOHAUSER, Assistant Examiner